United States Patent
Garg et al.

(10) Patent No.: US 8,438,337 B1
(45) Date of Patent: May 7, 2013

(54) SYSTEM AND METHOD FOR CONDITIONALLY SENDING A REQUEST FOR DATA TO A HOME NODE

(75) Inventors: Gaurav Garg, San Jose, CA (US); David T. Hass, Santa Clara, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 554 days.

(21) Appl. No.: 12/571,230

(22) Filed: Sep. 30, 2009

(51) Int. Cl.
    *G06F 12/00* (2006.01)
(52) U.S. Cl.
    USPC ........... 711/121; 711/130; 711/144; 711/146; 711/147; 711/156
(58) Field of Classification Search .................. 711/121, 711/130, 144, 146, 147, 156
    See application file for complete search history.

(56) References Cited

U.S. PATENT DOCUMENTS

| | | | |
|---|---|---|---|
| 5,802,578 A | 9/1998 | Lovett | |
| 6,055,605 A * | 4/2000 | Sharma et al. | 711/130 |
| 6,115,804 A * | 9/2000 | Carpenter et al. | 712/28 |
| 6,343,346 B1 * | 1/2002 | Olnowich | 711/142 |
| 6,598,123 B1 * | 7/2003 | Anderson et al. | 711/133 |
| 6,704,845 B2 * | 3/2004 | Anderson et al. | 711/146 |
| 7,035,968 B1 | 4/2006 | Pereira | |
| 7,143,245 B2 * | 11/2006 | Tierney et al. | 711/144 |
| 7,174,419 B1 | 2/2007 | Ichiriu et al. | |
| 7,215,004 B1 | 5/2007 | Nataraj | |
| 7,437,520 B2 * | 10/2008 | Shen et al. | 711/146 |
| 7,568,073 B2 * | 7/2009 | Shen et al. | 711/145 |
| 7,589,362 B1 | 9/2009 | Argyres et al. | |
| 7,818,391 B2 * | 10/2010 | Van Doren et al. | 709/217 |
| 7,856,535 B2 * | 12/2010 | Shen et al. | 711/146 |
| 8,099,557 B2 * | 1/2012 | McCalpin et al. | 711/130 |
| 2006/0230237 A1 | 10/2006 | Sakamoto | |
| 2007/0150664 A1 | 6/2007 | Dombrowski et al. | |
| 2007/0287229 A1 | 12/2007 | Nataraj | |
| 2009/0250820 A1 | 10/2009 | Argyres et al. | |

* cited by examiner

*Primary Examiner* — Stephen Elmore
(74) *Attorney, Agent, or Firm* — Sterne, Kessler, Goldstein & Fox P.L.L.C.

(57) ABSTRACT

A system and method are provided for sharing data between a network including one or more network nodes. The network includes a number of individual network nodes and a home network node communicating with one another. The individual network nodes and the home network node include a plurality of processors and memory caches. The memory caches consist of private caches corresponding to individual processors, as well as shared caches which are shared among the plurality of processors of an individual node and accessible by the processors of the other network nodes. Each network node is capable of executing a hierarchy of data requests that originate in the private caches of an individual local network node. If no cache hits occur within the local network node, a conditional request is sent to the home network node to request data through the shared caches of the other network nodes.

21 Claims, 7 Drawing Sheets

SYSTEM AND METHOD FOR CONDITIONALLY SENDING A REQUEST FOR DATA TO A HOME NODE

FIELD OF THE INVENTION

The present invention relates to multiprocessor systems, and more particularly to efficiently querying nodes in such systems for data.

BACKGROUND

Current cache coherence protocols typically fail to recognize and take advantage of the difference in data transfer latency between on-node cache requests and cache requests on other nodes. Many times, this results in coherence protocols incurring the latency of unnecessary node hops while performing a cache request. There is thus a need for addressing these and/or other issues associated with the prior art.

SUMMARY

A system, method, and computer program product are provided for conditionally sending a request for data to a home node. In operation, a first request for data is sent to a first cache of a node. Additionally, if the data does not exist in the first cache, a second request for the data is sent to a second cache of the node. Furthermore, a third request for the data is conditionally sent to a home node.

DETAILED DESCRIPTION

Figure 1:
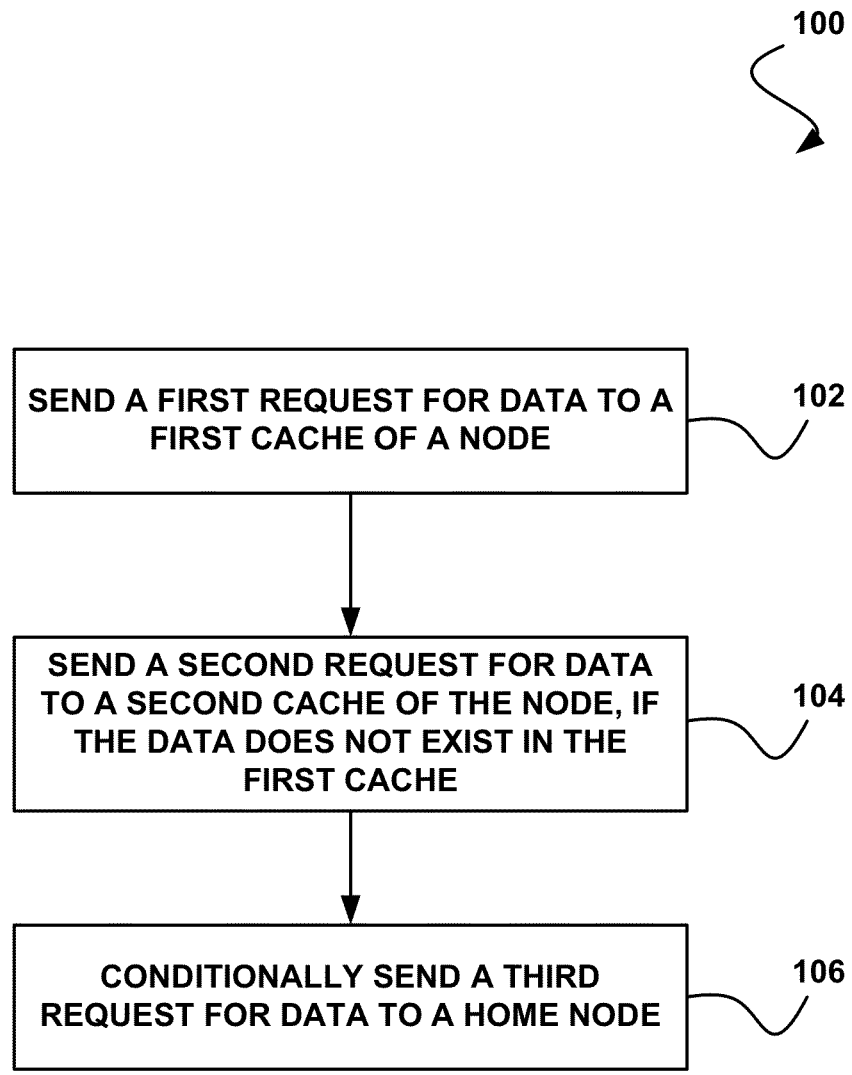
FIG. 1 shows a method for conditionally sending a request for data to a home node, in accordance with one embodiment.

FIG. 1 shows a method 100 for conditionally sending a request for data to a home node, in accordance with one embodiment. As shown in operation 102, a first request for data is sent to a first cache of a node.

In the context of the present description, the node refers to any component of a system capable of containing data in a cache. In various embodiments, the node may include one or more processors (e.g. central processing units (CPUs), microprocessors, graphics processors, etc.), one or more caches, communication interfaces, and/or any other component. In another embodiment, the node may include multiple processors, each having a separate private cache. For example, the node may include 2 processors, 4 processors, 8 processors, 16 processors, etc. Additionally, the node may include a shared public cache.

In still another embodiment, the node may include a System-on-Chip (SoC) architecture including one or more processor cores and associated caches. For example, the node may include a chip-multi-processor (CMP). In another embodiment, the node may be part of a multi-node system.

Additionally, with respect to the present description, the first cache may include any type of cache memory. In one embodiment, the first cache may include a cache of a particular hierarchy level. For example, the first cache may include a level 1, (L1) cache, a level 2 (L2) cache, a level 3 (L3) cache, etc. In another embodiment, the first cache may include a cache associated with a processor of the node. For example, the first cache cache may include a private cache of a processor of the node. In another example, a processor of the node may send the first request, and the first cache may include the private cache of the processor sending the first request.

Further, the data may include any information that can be stored in a cache. In one embodiment, the data may include a tag. In another embodiment, the data may include a memory location. For example, a request for a particular memory location may be sent to the first cache to determine whether the first cache contains the particular memory location. In yet another embodiment, the data may include the tag and the memory location.

Additionally, in one embodiment, the first request for data may be sent by any element of the node. For example, the first request for data may be sent by a processor of the node. In another embodiment, the first request for data may be sent by a coherency controller. In yet another embodiment, the first request may be generated by a private cache of a processor of the node. In still another embodiment, the first request may be generated by a communication interface, a hardware accelerator, or any other component of the SoC architecture.

Further still, the first request for data may include any request associated with the data. For example, the first request for data may include a read request. In another example, the first request for data may include a write request. In yet another example, the first request for data may include a snoop request.

Also, as shown in operation 104, if the data does not exist in the first cache, a second request for the data is sent to a second cache of the node. In one embodiment, the second request for the data may be sent in the same manner as the first request. Of course, however, the second request for the data may be sent in any manner. In another embodiment, the first cache may return a notification that the data does not exist in the first cache in response to the request for data. For example, the first cache may return a cache miss in response to the first request for data if the data does not exist in the first cache.

Further, in one embodiment, the second cache may include any cache memory of the node other than the first cache. For example, the second cache may include a second private cache of a second processor of the node. In yet another embodiment, the second cache may include a shared cache of the node. For example, the second cache may include a cache that is shared by two or more processors of the node. In another example, the second cache may include a level 3 (L3) cache.

Additionally, a third request for the data is conditionally sent to a home node. See operation 106. In one embodiment, the second and third requests may be sent by the coherency controller. Additionally, in the context of the current embodiment, the home node may include any node to which a memory address is allocated. For example, the data may be associated with (e.g., mapped to, etc.) a memory address. This memory address may fall under a portion of memory addresses allocated to a node which is referred to as the home node for that portion of memory addresses. In one embodiment, the home node may be part of a multi-node system.

In one embodiment, the third request for the data may be sent to the home node if the second request for data cannot be satisfied within the node. For example, the third request for the data may be sent to the home node if the data does not exist in one or more caches of the node. In another example, the third request for the data may be sent if the data does not exist in the second cache. In yet another example, the third request for the data may be sent if the data does not exist in all local caches of the node.

In another embodiment, the third request for the data may be sent to the home node if a state of the data in at least one cache of the node does not meet one or more criteria. For example, the third request for the data may be sent to the home node if one of the requests includes a write request, the data exists in a cache of the node, and the state of the data in the cache indicates that additional copies of the data exist in additional nodes (e.g., nodes other than the current node). In another example, the third request for the data may not be sent to the home node if one of the requests includes a read request and the data exists in a cache of the node. In yet another example, the third request for the data may not be sent to the home node if one of the requests includes a read request, or if the request includes a write request, if the data exists in a cache of the node, and if the state of the data in the cache indicates that additional copies of the data do not exist in additional nodes (e.g., nodes other than the current node).

It should be noted that the method 100 may be implemented in the context of any multiprocessor system. For example, in one embodiment, the method 100 may be implemented in the context of a cache coherent non-uniform memory architecture (ccNUMA). In another embodiment, the method 100 may be implemented in the context of a point-to-point multiprocessor system. In yet another embodiment, the method 100 may be implemented in the context of a point-to-point link based ccNUMA multiprocessor system, a symmetric multiprocessor (SMP) system, etc.

In this way, unnecessary requests for data from the home node may be avoided. Additionally, data may be requested from caches in a local node before being requested from caches in other nodes, where the caches in the local node have a lower latency than caches in other nodes. As a result, overall latency from cache data requests and transfers may be minimized.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
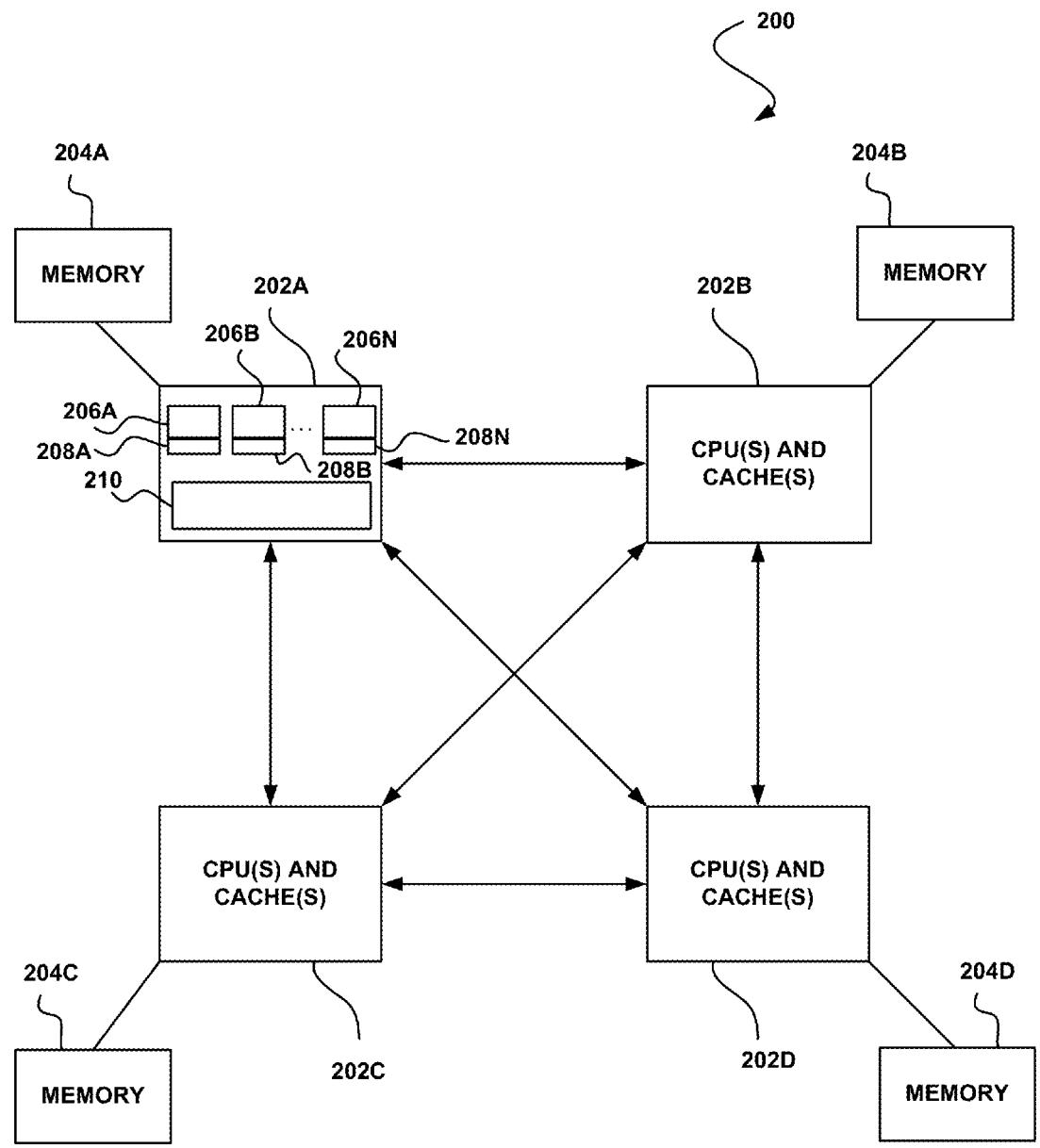
FIG. 2 shows a multiprocessor system for conditionally sending a request for data to a home node, in accordance with another embodiment.

FIG. 2 shows a multiprocessor system 200 for conditionally sending a request for data to a home node, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 includes a plurality of nodes 202A-D, each including processors and associated caches. For example, node 202A includes processors 206A-N, each containing a private cache 208A-N. In one embodiment, each of private caches 208A-N may include an L2 cache. In another embodiment, each of private caches 208A-N may include an L1 cache. Additionally, node 202A includes a shared cache 210. In one embodiment, shared cache 210 may include an L3 cache. In another embodiment, shared cache 210 may include an L2 cache. Of course, however, any cache hierarchy may be utilized.

Additionally, each of the nodes 202A-D also has an associated memory 204A-D. For example, the total available memory for the system 200 may be divided among all the nodes 202A-D and may be physically attached to the node to which it is allocated. In one embodiment, a total available memory may be divided into associated memory 204A-D, where each of associated memory 204A-D is assigned to nodes 202A-D, respectively. For example, each of nodes 202A-D may be the home node for its corresponding associated memory 204A-D.

Further, the associated memory 204A-D may include any type of memory, for example, dynamic random access memory (DRAM), etc. Further still, the total address space of software running on the system 200 may be divided amongst the memory 204A-D. In this way, particular addresses may be associated with particular portions of the memory.

In accordance with one exemplary embodiment, a processor of a node in system 200 may send a first request for data to its private cache. For example, processor 206A of node 202A may send a first request for data to its respective private cache 208A. Additionally, if private cache 208A contains the data, a cache hit may occur and private cache 208A may return the data to processor 206A.

However, if the requested data does not exist in private cache 208A, a cache miss may occur. Additionally, if the requested data does not exist in private cache 208A, a second request for the data may be sent to a second cache of the node 202A. For example, one or more snoops for the requested data may be sent to one or more of private caches 208B-N and shared cache 210 of node 202A.

Further, a third request for the data may be conditionally sent to a home node of the system 200. For example, the third request for the data may be sent to the home node if the request for the data cannot be satisfied by a cache in node 202A. In one embodiment, the requested data may be associated with a particular memory address that falls within a portion of memory addresses allocated to node 202B, where 202B is the home node of the address associated with the data. As a result, in one embodiment, the third request may be conditionally sent to home node 202B.

Further still, if the home node receives the third request, the home node may send a snoop request for the data to one or more of nodes in the system 200. For example, once the node 202B receives the request, node 202B may send a snoop request for the data to one or more of nodes 202A, 202C, and 202D. Each of nodes 202A, 202C, and 202D that receive the snoop request may then check all caches in their respective node and send responses to the home node 202B.

As a result, if the requested data is found in a cache other than cache 208A in node 202A, additional data requests are not sent to home node 202B. This results in an avoidance of unnecessary multiple inter-chip hops since a cache on the requesting processor's node returns the requested data, and thereby reduces overall latency.

Figure 3:
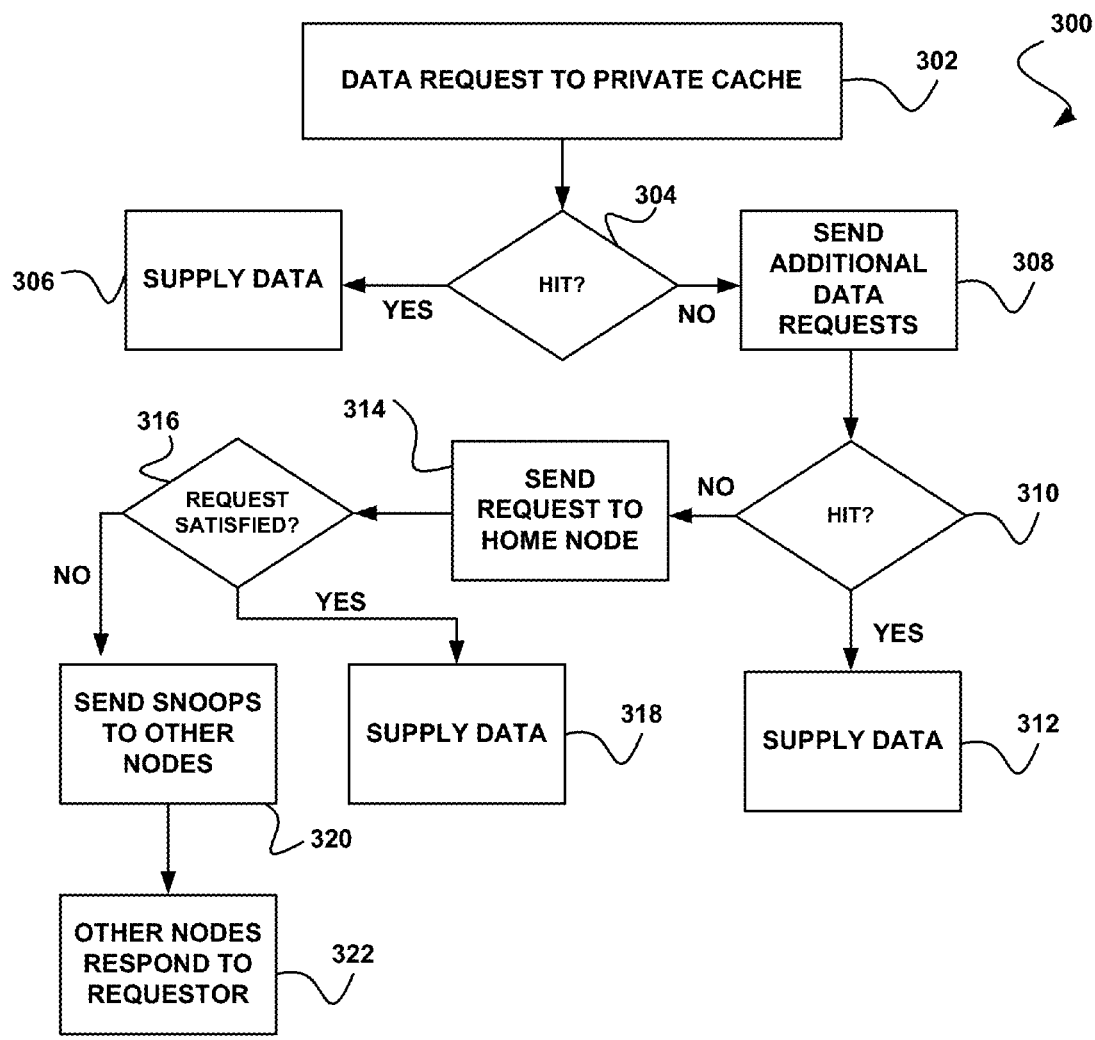
FIG. 3 shows a method for implementing a chip-multiprocessor aware cache coherency protocol, in accordance with yet another embodiment.

FIG. 3 shows a method 300 for implementing a chip-multiprocessor aware cache coherency protocol, in accordance with yet another embodiment. As an option, the method 300 may be implemented in the context of the functionality and architecture of FIGS. 1-2. Of course, however, the method 300 may be implemented in any desired environment.

As shown in operation 302, a processor of a node sends a request for data to its private cache. For example, processor 206A of node 202A may send a request for data to its respective private cache 208A. Additionally, as shown in decision 304, it is determined whether the request for data results in a cache hit. For example, it may be determined whether private cache 208A returns a cache hit or a cache miss in response to processor 206A's request for data.

If it is determined in decision 304 that the request for data results in a cache hit, then in operation 306 the requested data is supplied to the processor. For example, the private cache 208A may return the requested data to processor 206A. However, if it is determined in decision 304 that the request for data does not result in a cache hit, then in operation 308 additional requests for the data are sent to all other local caches of the node. For example, snoops for the data may be sent to private caches 208B-N and shared cache 210.

Further, in decision 310 it is determined whether the additional requests for data result in a cache hit that meets predetermined criteria. For example, it may be determined whether the request includes a read or write request, whether the data exists in any of private caches 208B-N and shared cache 210, and if the data exists, whether the state of the data indicates that additional copies of the data do not exist in nodes other than node 202A.

If it is determined in decision 310 that the additional requests for data result in a cache hit that meets the predefined criteria, then in operation 312 the requested data is supplied to the processor. For example, if it is determined that the request includes a read or write request, the data exists in at least one of private caches 208B-N and shared cache 210, and that the state of the data indicates that additional copies of the data do not exist in nodes other than node 202A, the requested data may be returned to processor 206A.

However, if it is determined in decision 310 that the additional requests for the data do not result in a cache hit that meets the predefined criteria, then in operation 314 the node sends a request for data to a home node. For example, if it is determined that the data does not exist in at least one of private caches 208B-N and shared cache 210, or that the request includes a write request and the data does exist in at least one of private caches 208B-N and shared cache 210, but that the state of the data indicates that additional copies of the data exist in nodes other than node 202A, node 202A may send a request for the data to a node in system 200 that is determined to be the home node for a particular memory address associated with the requested data.

Additionally, in decision 316, the home node may determine whether the request for the data can be satisfied locally. For example, the home node may determine whether one or more caches in the home node can satisfy the request for the data. If it is determined in decision 316 that the request for data can be satisfied locally, then in operation 318 the requested data is supplied to the processor. However, if it is determined in decision 316 that the request for data cannot be satisfied locally, in operation 320 the home node sends snoop requests for the data to one or more additional nodes. For example, snoop requests for the data may be sent to one or more nodes in system 200.

In one embodiment, snoop requests may be sent only to nodes in the system 200 that at least potentially include a copy of the requested data. See, for example, U.S. patent application Ser. No. 12/332,061, filed Dec. 10, 2008, which is hereby incorporated by reference in its entirety, and which describes an example of sending snoop requests only to nodes in a multiprocessor system that at least potentially include a copy of requested data.

Further, in operation 322 all nodes that received snoop requests for the data from the home node send responses to the requesting node. For example, all nodes in system 200 that received snoop requests from the home node may send responses to the node 202A. Additionally, all nodes in system 200 that received snoop requests from the home node may update their cache states based on the snoop request.

As a result, requests for data may be sent to local caches first, and the requests for data may not be sent to the home node if the requests can be satisfied locally. In one embodiment, correct transaction ordering and functional correctness may also be maintained in a deadlock-free manner.

In this way, one or more characteristics of shared memory applications may be exploited, which may result in a reduction of at least one of the transaction latency and bandwidth demand of the system. For example, lower snoop and cache-to-cache data transfer latency from another cache in the same node as compared to a cache in another node may be exploited.

Figure 4:
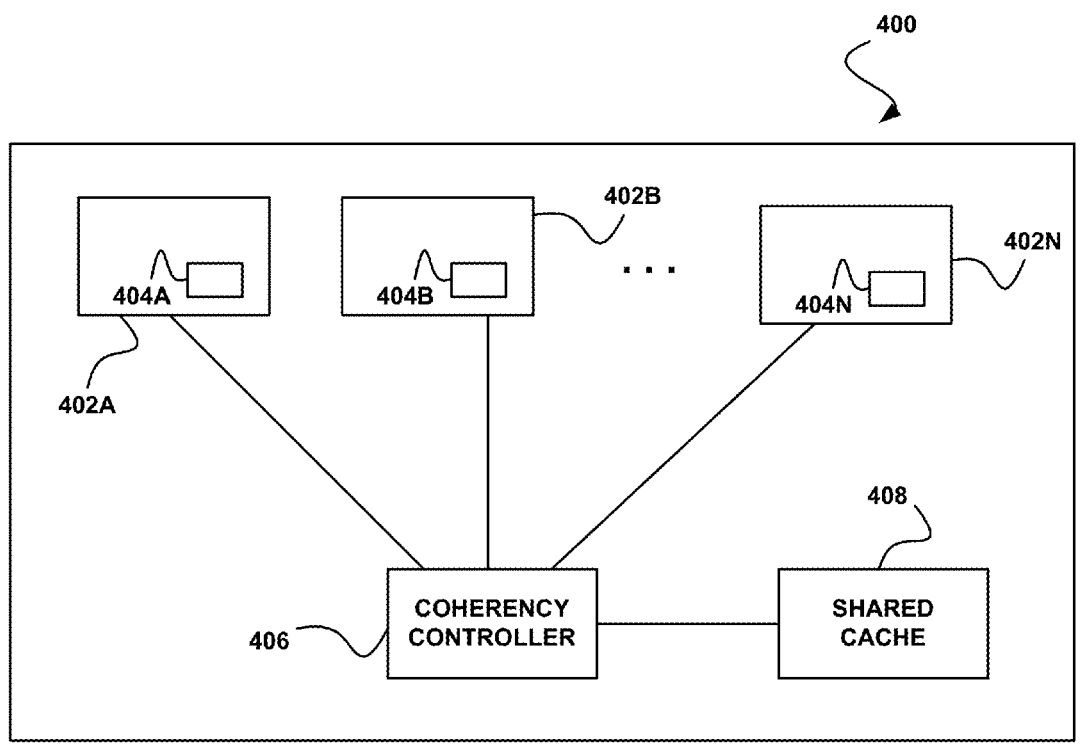
FIG. 4 shows an exemplary node for conditionally sending a request for data to a home node, in accordance with still another embodiment.

FIG. 4 shows an exemplary node 400 for conditionally sending a request for data to a home node, in accordance with still another embodiment. As an option, the node 400 may be implemented to carry out one or more of method 100 of FIG. 1, method 300 of FIG. 3, etc. Of course, however, the chip multi processor 400 may be implemented in any desired environment. It should also be noted that the aforementioned definitions may apply during the present description.

As shown, the node 400 includes processors 402A-N, each containing a private cache 404A-N. In addition, each of the processors is in communication with a coherency controller 406. Additionally the coherency controller 406 is in communication with a shared cache 408. In one embodiment, the coherency controller 406 may ensure that any change to data within a cache is observed by all other caches which have a copy of that data. For example, the coherency controller may enforce a cache coherency protocol.

In accordance with one exemplary embodiment, a processor of node 400 may send a request for data to its private cache. For example, processor 402A may send the request for data to its respective private cache 404A. Additionally, if private cache 404A contains the data, a cache hit may occur and private cache 404A may return the data to processor 206A.

However, if the requested data does not exist in private cache 404A, a cache miss may occur. Additionally, in response to the cache miss, processor 402A may send a request for the data to the coherency controller 406. In response, the coherency controller 406 may send a snoop request for the data to all local caches in node 400. For example, the coherency controller 406 may send a snoop request for the data to private caches 404B-N and shared cache 408.

Further, based on the responses from all the local caches in node 400, the coherency controller 406 may determine whether processor 402A's request for data can be satisfied locally, and may conditionally send a request for the data to a home node based on the determination. For example, each of the local caches in node 400 may include a cache state that is associated with the requested data (e.g., as a cache tag, etc.). This cache state may describe whether a cache contains particular data, and whether the data is clean or dirty.

In one embodiment, in each of the local caches in node 400, the cache state may be analyzed along with a type of the request for data in order to determine whether the request for data can be satisfied locally. One exemplary cache state protocol is shown in Table 1. Of course, it should be noted that the current embodiment may not be limited to the cache state protocol shown in Table 1, and that any other cache state protocol may be used (e.g., MESI cache protocol, etc.). Additional exemplary cache state protocols may be found in U.S. application Ser. No. 12/571,233, filed Sep. 30, 2009, which is hereby incorporated by reference in its entirety.

TABLE 1

| Symbol | Name | Definition |
| --- | --- | --- |
| M | Dirty Exclusive | Dirty data; no other cache in the system has a copy |
| O | Dirty Owned | Dirty data; some other cache in the system may have a copy |
| E | Clean Exclusive | Clean data; no other cache in the system has a copy |
| S | Clean Owned | Clean data; some other cache in the system may have a copy |
| I | Invalid | This cache does not have a copy of the data |

In one embodiment, the coherency controller 406 may determine the type of the request that constitutes processor 402A's request for data. For example, the coherency controller 406 may determine if processor 402A's request for data is a read request (e.g., a request to read data from a particular address, a read to share request, etc.) or a write request (e.g., a request to write data to a particular address, a read exclusive request, a read to own request, etc.).

Additionally, based on the responses from all the local caches in node 400, the coherency controller 406 may determine whether a cache hit has occurred. If no cache hit has occurred, the coherency controller 406 may send a request for the data to the home node. However, if at least one of the responses from all the local caches in node 400 results in a cache hit for the data, then the coherency controller 406 may determine the cache state associated with the data in the local caches, and may conditionally send a request for the data to a home node based on the cache state and the type of the request.

For example, if the coherency controller 406 determines that the request is a read request, and that the cache state associated with the data in at least one of the local caches is one of M, O, E, or S as illustrated above in Table 1, then the coherency controller may return the data to processor 206A. In this way, a copy of the requested read data may be sent to the requesting processor.

Additionally, in another example, if the coherency controller 406 determines that the request is a write request, and that the cache state associated with the data in at least one of the local caches is one of M or E, as illustrated above in Table 1, then the coherency controller 406 may also return the data to processor 206A. In this way, the only cache in the system that has the data may be written to.

Further, in yet another example, if the coherency controller 406 determines that the request is a write request, and that the cache state associated with the data in at least one of the local caches is one of O or S, as illustrated above in Table 1, then the coherency controller 406 may send a request for the data to a home node (not shown). In turn, the home node may send a snoop request for the data to all local caches in the home node.

Further still, based on the responses from all the local caches in the home node, the home node may determine whether the request for data can be satisfied locally, and may conditionally send snoop requests for the data to one or more additional nodes based on the determination. In this way, all additional caches that have a copy of the requested data may be invalidated.

Of course, it should be noted that the current embodiment may not be limited to the aforementioned determinations. For example, coherency controller 406 may conditionally send a request for the data to a home node, and the home node may conditionally send snoop requests for the data to all other nodes in the system, based on any type of determination.

Figure 5:
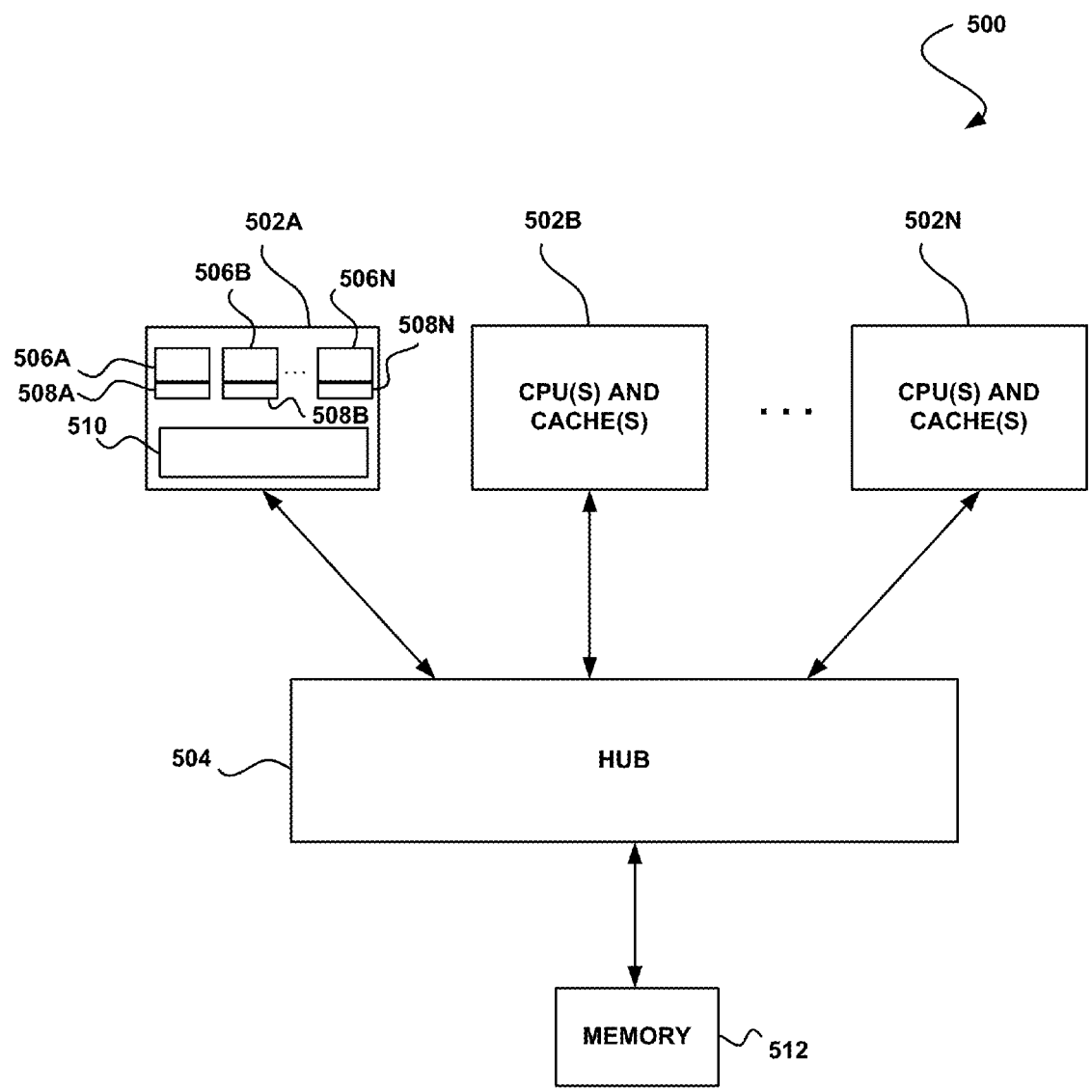
FIG. 5 shows an exemplary symmetric multiprocessor (SMP) system in which the various previous embodiments may be implemented, in accordance with another embodiment.

FIG. 5 shows an exemplary symmetric multiprocessor (SMP) system 500 in which the various previous embodiments may be implemented, in accordance with another embodiment. As an option, the system 500 may be implemented to carry out one or more of method 100 of FIG. 1, method 300 of FIG. 3, etc. Of course, however, the system 500 may be implemented in any desired environment. It should also be noted that the aforementioned definitions may apply during the present description.

As shown, the system 500 includes a plurality of nodes 502A-N, each including processors and associated caches. For example, node 502A includes processors 506A-N, each containing a private cache 508A-N. Additionally, node 502A includes a shared cache 510. Additionally, each of the nodes 502A-N are in communication with each other as well as an associated memory 512 via a hub 504.

Figure 6:
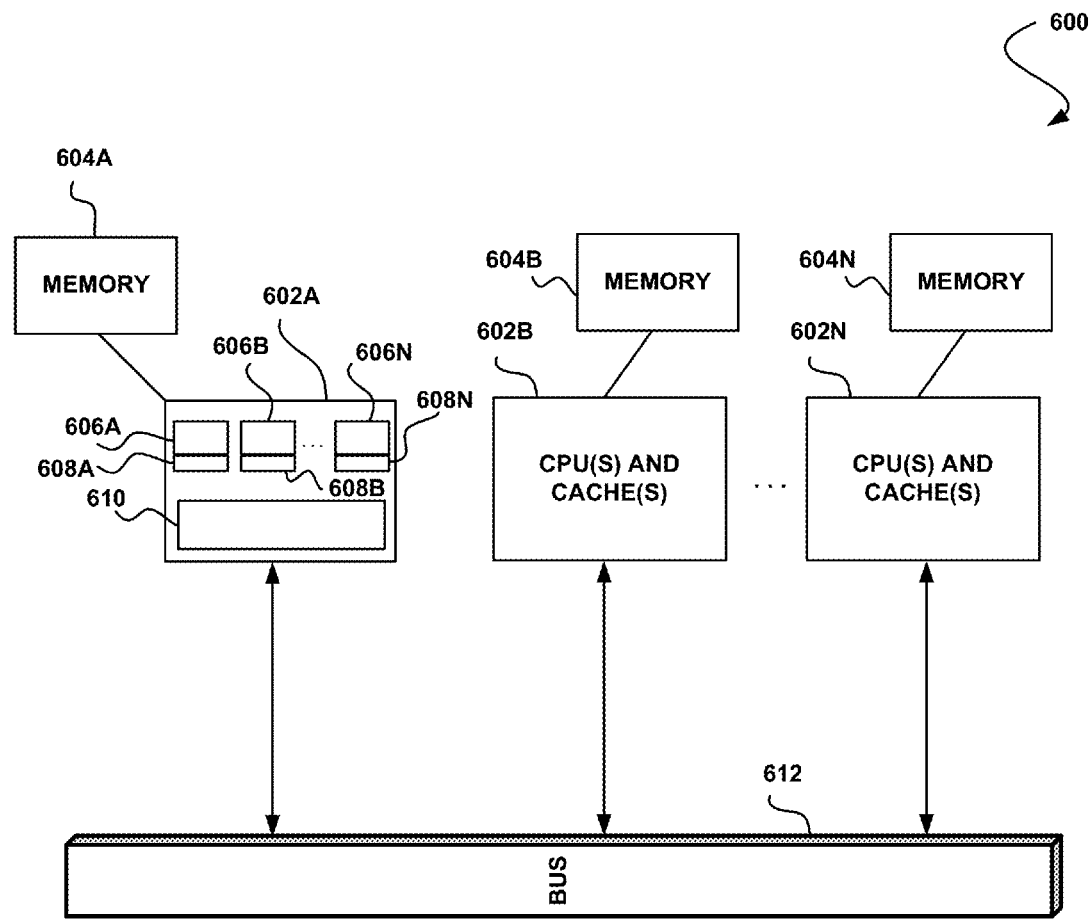
FIG. 6 shows an exemplary non-uniform memory architecture (NUMA) system in which the various previous embodiments may be implemented, in accordance with yet another embodiment.

FIG. 6 shows an exemplary non-uniform memory architecture (NUMA) system 600 in which the various previous embodiments may be implemented, in accordance with yet another embodiment. As an option, the system 600 may be implemented to carry out one or more of method 100 of FIG. 1, method 300 of FIG. 3, etc. Of course, however, the system 600 may be implemented in any desired environment. It should also be noted that the aforementioned definitions may apply during the present description.

As shown, the system 600 includes a plurality of nodes 602A-N, each including processors and associated caches. For example, node 602A includes processors 606A-N, each containing a private cache 608A-N. Additionally, node 602A includes a shared cache 610. Additionally, each of the nodes 602A-N also has an associated memory 604A-N. Further, each of the nodes 602A-N is in communication with the other nodes 602A-N via a bus 612.

Figure 7:
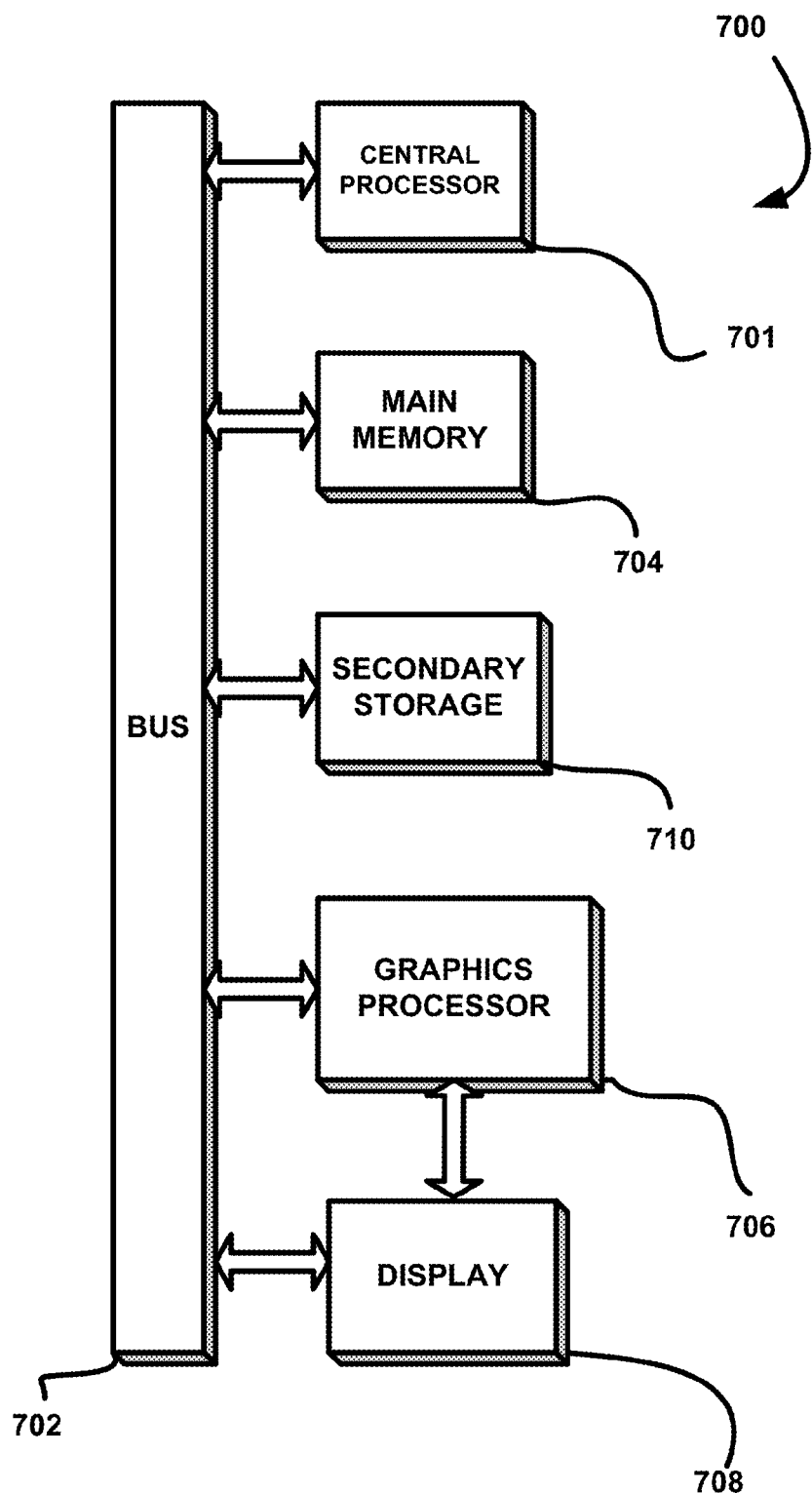
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices including, but not limited to, a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. In a processor, a method, comprising:
sending a first request for cache data to a first cache of a first network node;
sending a second request for the cache data to a second cache of the first network node, if the cache data does not exist in the first cache; and
conditionally sending a third request for the cache data to a home network node.

2. The method of claim 1, wherein the step of conditionally sending comprises:
sending the third request for the cache data to the home network node if the cache data does not exist in the second cache.

3. The method of claim 1, wherein the step of conditionally sending comprises:
sending the third request for the cache data to the home network node if the cache data does not exist in all local caches of the first network node.

4. The method of claim 1, wherein the step of conditionally sending comprises:
sending the third request for the cache data to the home network node if a state of the cache data in a cache of the first network node does not meet a criterion.

5. The method of claim 1, wherein the steps of sending the second request and conditionally sending the third request comprise:
sending the second request and the third request utilizing a coherency controller.

6. The method of claim 1, further comprising:
receiving a cache miss from the first cache in response to the first request for the cache data if the cache data does not exist in the first cache.

7. The method of claim 1, wherein the first network node is from among a plurality of network nodes, and wherein the step of conditionally sending comprises:
sending the third request for the cache data to the home network node based upon:
the first request or the second request including a write request;
the cache data existing in the first cache of the first network node; and
a state of the cache data in the first cache indicating that additional copies of the cache data exist in additional network nodes of the plurality of network nodes.

8. The method of claim 1, wherein the step of conditionally sending further comprises:
not sending the third request for the cache data to the home network node if the first request or the second request includes a read request and the cache data exists in a cache of the first network node.

9. A network node, comprising:
a first cache configured to store cache data;
a second cache configured to store cache data; and
a processor configured to:
send a first request for the cache data to the first cache;
send a second request for the cache data to the second cache, if the cache data does not exist in the first cache; and
conditionally send a third request for the cache data to a home network node.

10. The network node of claim 9, wherein the processor is from among a plurality of processors, each processor of the plurality of processors having a private cache.

11. The network node of claim 9, wherein the network node is from among a plurality of network nodes, and wherein the network node further comprises:
a shared cache configured to be shared among the plurality of network nodes.

12. The network node of claim 9, wherein the first cache is a private cache of the processor.

13. The network node of claim 12, wherein the network node further comprises:
a second processor, wherein the second cache is a private cache of the second processor.

14. The network node of claim 9, wherein the first cache is a level 2 (L2) cache.

15. The network node of claim 9, wherein the processor is from among a plurality of processors, and wherein the second cache is configured to be shared among the plurality of processors.

16. The network node of claim 9, wherein the second cache is a level 3 (L3) cache.

17. The network node of claim 9, further comprising:
a memory, wherein the cache data includes a memory address corresponding to the memory.

18. The network node of claim 17, wherein the memory address corresponds to a memory address allocated to the home network node.

19. The network node of claim 9, wherein the network node is incorporated as part of a System-on-Chip (SoC) architecture.

20. The network node of claim 9, wherein the network node is from among a plurality of network nodes.

21. A network node, comprising:
    a plurality of processors each including a corresponding private cache, each of the plurality of processors configured to request cache data from the corresponding private cache and to determine a cache hit or a cache miss;
    a shared cache configured to be shared among the plurality of processors; and
    a coherency controller configured to send a snoop request to the shared cache and to each of the corresponding private caches based on the determination of the cache hit or the cache miss.

* * * * *